United States Patent [19]
Schoppee et al.

[11] 3,816,052
[45] June 11, 1974

[54] OPERATING APPARATUS FOR THE PLATENS IN A THERMOFORMING MACHINE

[75] Inventors: Lawrence W. Schoppee, Springfield, Mass.; James L. Meagher, Jr., Rogers, Conn.

[73] Assignee: Package Machinery Company, East Longmeadow, Mass.

[22] Filed: July 17, 1972

[21] Appl. No.: 272,577

[52] U.S. Cl. ............... 425/406, 425/352, 74/40, 74/109, 74/143, 100/264
[51] Int. Cl. ............................................. B29c 3/00
[58] Field of Search ........... 425/406, 352, 220, 222, 425/354; 100/264, 272, 282, 288, 291, 292; 74/106, 109, 143, 29, 39, 40, 25

[56] References Cited
UNITED STATES PATENTS

| | | | |
|---|---|---|---|
| 468,396 | 2/1892 | Mowry | 425/352 |
| 1,292,869 | 1/1919 | Peterson | 425/352 |
| 1,368,836 | 2/1921 | Priester | 425/406 X |
| 1,768,500 | 6/1930 | Bailey | 425/352 |
| 2,048,558 | 7/1936 | Moore | 425/352 |
| 2,127,994 | 8/1938 | Davis et al. | 425/DIG. 26 |
| 2,325,687 | 8/1943 | Kux | 425/355 |
| 2,882,556 | 4/1959 | Hall | 425/352 X |
| 3,459,056 | 8/1969 | Lea | 74/29 X |

*Primary Examiner*—Robert L. Spicer, Jr.
*Attorney, Agent, or Firm*—McCormick, Paulding & Huber

[57] ABSTRACT

A press or platen operating mechanism for a thermoforming machine wherein the platens and their associated molds are closed and opened on a sheet of plastic material by cam operated linkages. The linkages include elements extending from a cam for each platen and the cam and linkages provide for adjustment of the timing and stroke of each platen independently of the other platen. The linkages also include rack and pinion driven toggle links so arranged that the force holding the platens and molds in closed relationship bears upon the machine frame and not upon any guide rods or tie bars generally associated with such relatively movable platens.

9 Claims, 3 Drawing Figures

PATENTED JUN 11 1974

OPERATING APPARATUS FOR THE PLATENS IN A THERMOFORMING MACHINE

BACKGROUND OF THE INVENTION

In the operation of a plastic thermoforming machine, it is a customary practice to advance a sheet or web of plastic through the machine in indexed steps of movement. In one step or at one station, a section of the plastic sheet or web is heated until it becomes soft and pliable. Then, at the next index of movement, the heated section is placed between the opposed halves of a mold which are carried by opposed platens, the platens being movable toward and away from each other whereby respectively to engage the opposite surfaces of the heated section of the plastic sheet between the mold halves and to release the plastic sheet after it has been found. Cavities are generally defined in one mold half and male projections are formed on the other mold half to shape the plastic sheet into a plurality of containers, for example, and a vacuum may be drawn in the female mold half while air or other gas is introduced under pressure through the male mold half to assist in thermoforming or shaping the heated plastic area. When the mold halves are separated by operation of the platens, the formed section of the plastic sheet is moved ahead and the formed container cavities can be filled with product before the formed areas are cut from the sheet to provide individual product containers.

It is an object of the present invention to provide an economical and simple operating apparatus for the opposed platens in what may be referred to as the press section of the machine. It is a more specific object of the invention to provide such an operating apparatus wherein the forces employed in holding the mold halves closed are taken up by the frame of the thermoforming machine and need not be subjected to tie rods and/or guide rods which guide the movement of the platens and mold halves toward and away from each other in a straight path.

SUMMARY OF THE INVENTION

In keeping with the present invention a pair of rotatably driven cams are mounted on a cam shaft, there being one such cam for each platen. These cams provide the drive for the platen operating mechanism and each cam being adjusted and shaped independently of the other to provide independent timing of the operation of each platen and its associated mold half so that one such mold half can engage the heated plastic sheet and be moved away from the sheet at a time different from the other mold half, if such operation is desired. Each cam operates a linkage connected to its associated platen and such linkage includes a cam follower, a rack and a pinion. Thus, as each cam is rotated through one revolution the rack is reciprocated through one cycle to effect closing and opening movement of its associated platen and mold half. The pinion associated with each rack is mounted on a shaft rotatably supported in the machine frame and a crank arm rotates with the pinion shaft to effect the movement of the associated platen. That is, a connecting link is pivotally connected between the crank arm and the platen, and this link and crank arm are so arranged that in the closed or plastic engaging position of the platen and mold half the crank arm and connecting link are aligned substantially parallel to the path of movement of the platen. This means that the force holding the platen and mold half in closed position is borne by the machine frame at the pinion shaft.

Preferably, each cam and cam follower is utilized to operate or to reciprocate a pair of racks, one on each side of the associated platen, and each rack engages a pinion operating the crank mechanism described above. Accordingly, the operating forces are balanced on each side of each platen and its associated mold half.

Provision is made for adjustment of the stroke of each platen from its closed or plastic engaging position. That is, a connecting rod forming an element of the linkage and which is pivotally connected to a cam following lever is so arranged that it can be connected with the lever at any one of a plurality of positions along the lever with the associated platen and mold half in the closed position. This adjustment of connection along the cam operated lever effects the adjustment of the platen stroke when moved from the closed position.

BRIEF DESCRIPTION OF THE PREFERRED EMBODIMENT

Figure 3:
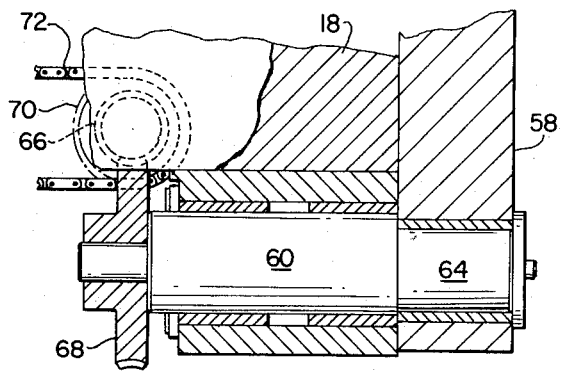
FIG. 3 is a vertical cross-sectional view on an enlarged scale taken as indicated by the line 3—3 of FIG. 1 and showing an adjusting mechanism for adjusting the position of the platen when closed with respect to the other platen.

Referring now to the drawings in greater detail, the reference number 10 designates one of a pair of rotatably driven cams located on opposite ends of a cam shaft 12. The cam shaft and thus the cams can be driven in any of several conventional ways. For example, a fixed speed motor can be utilized to driven an electromagnetic clutch and brake unit through a timing belt and pulley arrangement. The clutch, when energized, drives the input shaft of a reducer, and the output shaft of the reducer can be the cam shaft 12. One complete revolution of this output shaft and of each cam 10 constitutes one complete cycle of operation of the platen operating apparatus. The cycles per minute for the machine and apparatus may be changed by changing the ratio between the timing belt pulleys on the motor to clutch drive.

Each cam 10 has a closed track such as indicated at 14 which may be cut to control the motion of its associated platen, and the timing of operation of each cam 10 relative to the other cam 10 can be adjusted by adjusting the rotated position of a single cam or both cams on the cam shaft 12. This rotatable adjustment is accommodated by the pin and slot means indicated at 16.

Figure 1:
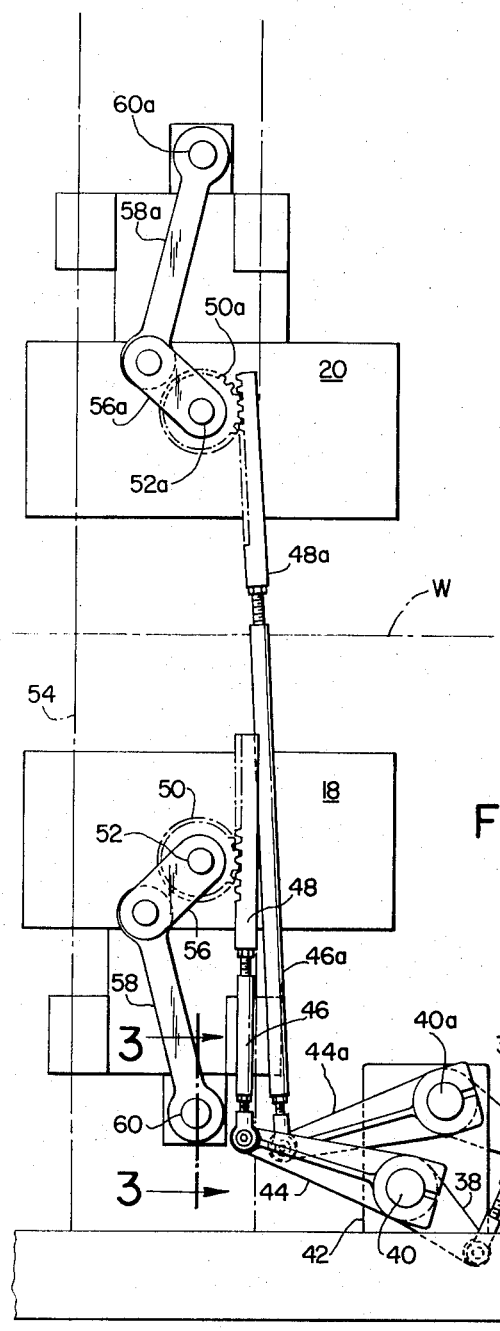
FIG. 1 is a generally schematic illustration of the platen operating apparatus and shows the platens and their mold halves in the retracted or separated condition.
Figure 2:
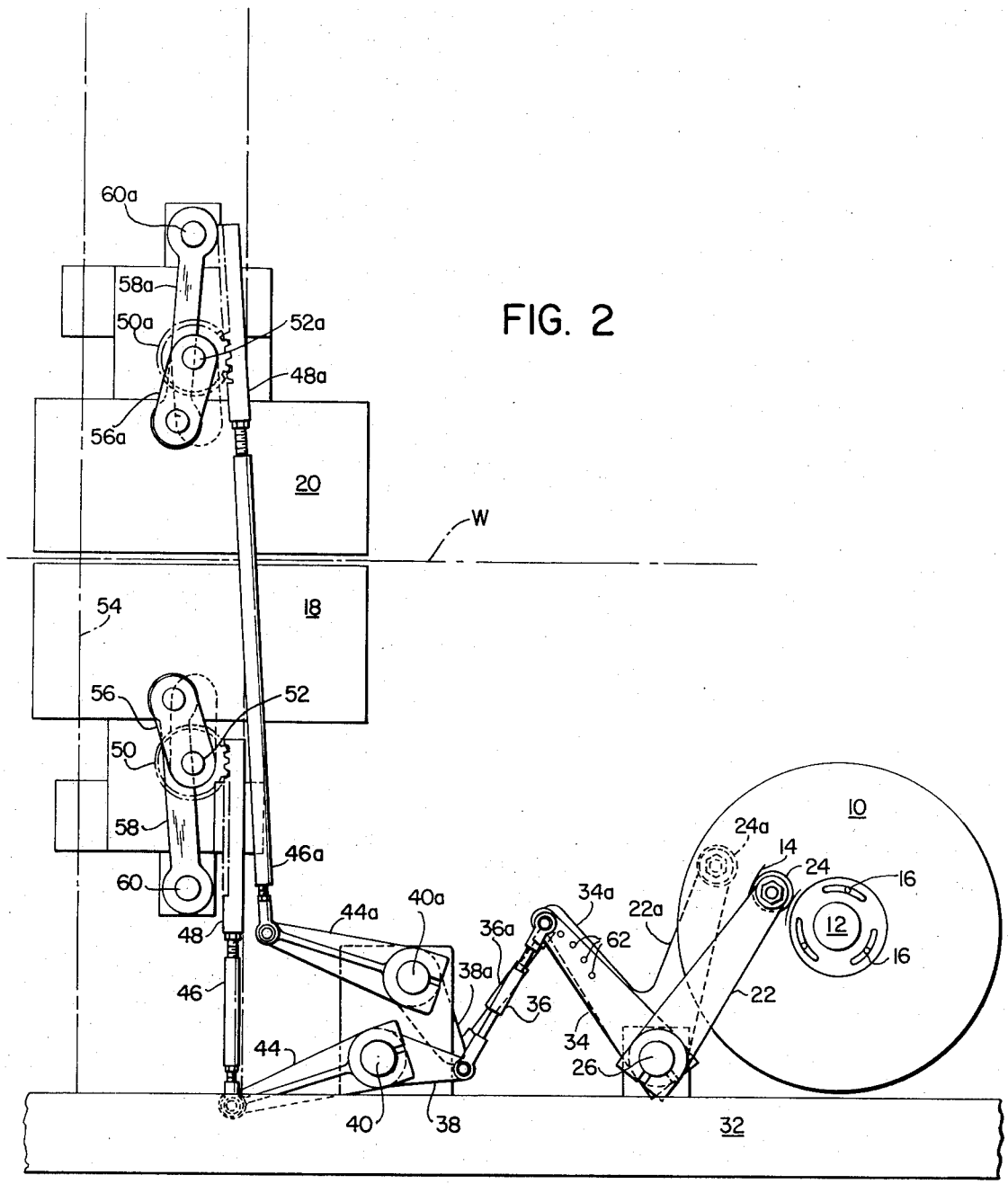
FIG. 2 is a view similar to FIG. 1 but shows the platens and mold halves in a position wherein they are nearly closed upon the plastic sheet to be formed.

As has been mentioned, each cam 10 is associated with a platen in the press section of the thermoforming machine. The cam 10 which is visible in FIGS. 1 and 2 is associated with the lower platen which has been shown schematically at 18 as combined with a mold half, and the cam 10 which is not visible is associated with the upper platen 20 and its associated mold half.

The linkages connecting the foreground cam 10 and the lower platen 18 include a cam follower lever 22 having a roller 24 engaged in the cam track 14, the lever 22 being secured to a rock shaft 26 journaled in a block 30 on the machine frame 32. A second lever 34 is mounted on the rock shaft 26 to pivot as the said shaft is rocked, and a connecting rod 36 is pivotally connected to the lever 34 at one of its ends and is also pivotally connected to a lever 38 at its other or bottom end. The lever 38 is secured to a second rock shaft 40 in a frame journal 42 to rock that shaft and thus to pivot a pair of levers 44 which are spaced apart on the rock shaft 40. The free end of each lever 44 is pivotally connected to the bottom end of a connecting rod 46 extending to a generally vertically disposed gear rack 48. There is one such lever 44, connecting rod 46, and rack 48 on each side of the lower platen 18.

Each rack 48 engages a pinion 50 mounted on a horizontal shaft 52 which is journaled in a vertical post (shown in broken outline at 54) which constitutes a part of the machine frame. A crank arm 56 is secured to the outer end of each pinion shaft 52 so as to be pivoted responsive to rotation of the associated pinion 50 which is, of couse, rotated responsive to the driven cam 10. The free end of the crank arm 56 is pivotally connected to one end of a link 58 which at its other end is pivotally connected to a shaft 60 journaled on the lower platen 18.

The connecting linkages between the other cam 10 and the upper platen 20 are substantially identical to those described and they are accordingly designated by the said reference numbers but with the suffix (a) added thereto.

It will be seen in FIG. 1 that when the lower platen and mold half 18 is widely separated from the upper platen and mold half 20, the cam following lever 22 is pivoted about as far in a counterclockwise direction as it can go on the axis of the rock shaft 26 and the cam follower lever 22a is pivoted about as far clockwise as it can go on a coincident axis. Then, in the closing movement of the platens and mold halves the cam follower lever 22 moves clockwise while the lever 22a moves counterclockwise. This cam follower movement and the accompanying rack movement pivots the lower and upper pinions 50 and 50a on each side of each of the said lower and upper platens to bring the crank arm and link 56 and 58 on the lower set of links toward substantial vertical alignment parallel to the movement of the platens and it brings the upper crank arm 56a and link 58a into substantial vertical alignment parallel to the vertical path of movement of the platens also. Thus, when the platens are positioned so that their mold halves are fully closed upon a web of plastic W, the vertical forces maintaining them in closed position are borne by the frame post 54 at the pinion shafts 52 and 52a. Guide rods and/or tie rods may be used to guide the movement of the upper and lower platens and mold halves toward and away from each other but no strain is imposed upon them due to the forces maintaining the mold halves in closed relationship to each other on the plastic web W.

It is, of course, desirable if not essential to be able to adjust the scope or stroke of movement of each platen from the closed position, this in order to accommodate mold halves of different size and shape. In keeping with the present invention stroke adjustment can be effected by adjusting the connection of the connecting rods 36 and 36a with their respective levers 34 and 34a, respectively. More specifically, each such lever 34 and 34a is provided with a series of pivot openings 62 spaced along an arc described by swinging the connecting rod 36 about its pivoted connection with the lever 38 and by swinging the connecting rod 36a about its pivoted connection with the lever 38a when the platens and mold halves are in their closed positions. By securing the connecting rod 36 and connecting rod 36a in adjusted position along the associated levers 34 and 34a, the effective length of such levers is adjusted and this adjusts the opening stroke of the platens from the same closed position no matter what the stroke shall be.

It is to be understood that the mold halves carried by the upper and lower platens are not moved into closed position with great force. That is, they do not compress the plastic sheet or web W between them, but they do engage the opposite surfaces of the sheet with sufficient force to prevent the escape of air from between the mold halves and the sheet as the sheet is being thermoformed. However, due to the arrangement of the connecting links and cranks extending from the pinions 50 and 50a to the lower and upper platens, opening of the mold halves or relative displacement of the platens is opposed by great force borne by the machine frame until such time as the pinions are rotated by cam operation. That is, the crank arms 56 and 56a and their associated connecting links 58 and 58a are aligned vertically parallel to the path of movement of the platens toward and away from each other and in an over-center relationship of their pivot points so that the force maintaining the mold halves closed is directed vertically and borne wholly or substantially wholly by the machine frame on the shafts of the pinions.

In further accord with the present invention, a simple means is provided for adjusting the lower platen and its associated mold half relative to the upper platen and its associated mold half, and vice versa, in the closed condition of the said mold halves. This is ordinarily done by "shimming," but in keeping with the present invention, the connecting link shafts 60 and 60a on the lower and upper platens 18 and 20 are eccentric as is best shown in FIG. 3.

More specifically, and as shown by way of example in FIG. 3, the shaft 60 journaled in the lower platen 18 has an eccentric end portion 64 received in the end of the link 58. Thus, by rotating the shaft 60 the platen 18 can be adjusted or displaced a slight amount relative to the link and thus adjust the position of the said platen and its associated mold half in the closed condition. The said shaft 60 can be rotated in the platen 18 by turning a worm 66 which engages a worm gear 68 connected to the inner end of the shaft 60. A sprocket 70 carried on the shaft of the worm 66 carries a chain 72 extending to a similar sprocket, worm, etc. associated with the shaft 60 and link 58 on the other side of the platen 18 so that when the worm 70 is rotated, the position of the platen will be adjusted at each side to assure parallelism. Preferably, a means (not shown) for manual rotation of the worm is provided. A similar construction is provided for the upper platen.

During a typical cycle of machine operation, the electromagnetic clutch is energized to rotate the output or cam shaft 12 and thus to rotate the platen cams 10. Starting with the closed condition of the platens and their associated mold halves, the mold halves are separated. When they are moved sufficiently far apart, the plastic web W is indexed, but the cams do not stop to index and the platens continue on to the full extent of the stroke which has been provided by the aforedescribed adjustment. Then, the platens dwell for whatever period is programmed by the shape of the cams and then the platens move toward each other to reengage the hot plastic web or sheet. When the mold halves do engage the sheet as desired and as set by adjustment of the platens as described, the crank and links extending from the pinions to the platens lock up the platens and the electromagnetic clutch is de-energized for whatever period of time is needed to thermoform the plastic sheet. At the end of the timed period, the clutch is again energized for a second cycle of operation.

We claim:

1. An apparatus for operating a pair of opposed platens in a thermoforming machine having a frame supporting the platens for movement in a straight path to bring mold halves into and out of engagement with the opposite surfaces of a sheet of plastic, said apparatus comprising a pair of driven cams, one such cam being associated with each platen, at least one rack and pinion associated with each platen, linkage means including a cam follower connected between the cam and rack associated with each platen to reciprocate the rack and rotate the associated pinion responsive to cam operation, each such pinion being rotatably supported in the machine frame, and pivoted links connected between each pinion and its associated platen including a crank rotatable with the pinion and so arranged that the links are substantially aligned parallel to said straight path when the mold half associated with the platen engages the plastic sheet in the closed position of the mold half in cooperation with the other mold half.

2. The operating apparatus set forth in claim 1 wherein each driven cam is individually adjustable so that the timing of movement of its associated platen can be adjusted independently of the timing of the other platen.

3. The operating apparatus of claim 1 wherein at least one cam is rotated when driven; the linkage means connected between the said at least one cam and its associated rack includes a pivotally supported lever which is oscillated responsive to cam rotation and a connecting rod pivotally connected at one of its ends to said lever and at the other of its ends to another element in the said linkage; and wherein the said lever is adapted for connection with the said one end of the connecting rod at any one of a plurality of locations along the lever when the associated platen is in a position corresponding to the closed position of its mold half, whereby the length of stroke of the platen from its said position may be adjusted.

4. The apparatus defined in claim 1 wherein the pivoted links connected between at least one pinion and its associated platen include a crank rotatable with the pinion and a connecting link pivotally connected at one of its ends to the free end of the crank and at the other of its ends to the platen, the pivotal connection to the platen comprising a shaft rotatable in the platen and having an eccentric end portion connected to the connecting link, whereby rotation of the shaft will cause adjustment of the position of the platen in bringing its associated mold half into engagement with the plastic sheet in cooperation with the other mold half.

5. The platen operating apparatus as defined in claim 1 wherein there are a pair of racks and pinions associated with each cam and platen, one rack and pinion being located on each of opposite sides of the associated pinion and its path of movement, and wherein a single cam follower is utilized in the said linkage means for operation of both racks associated with a platen.

6. The apparatus of claim 5 wherein each driven cam is rotatable and adjustable individually so that the timing of movement of its associated platen can be adjusted independently of the timing of the other platen.

7. The apparatus of claim 5 wherein each cam is rotatably driven and the cam follower for each cam comprises a pivotally supported lever which is oscillated responsive to rotation of its associated cam and the linkage means for the racks associated with its platen includes a connecting rod pivotally connected at one of its ends to said lever and at the other of its ends to another element in the said linkage, and wherein the said lever is adapted for connection with said one end of its connecting rod at any one of a plurality of locations along the lever when the associated platen is in a position corresponding to the closed position of its mold half, whereby the length of stroke of the platen from its said position may be adjusted.

8. The apparatus of claim 5 wherein the pivoted links connected between each pinion and its associated platen include a crank rotatable with the pinion and a connecting link pivotally connected at one of its ends to the free end of the crank and at the other of its ends to the platen, the pivoted connection to the platen comprising a shaft rotatable in the platen and having an eccentric end portion connected to the connecting link, whereby rotation of the shaft will cause adjustment of the position of the platen in bringing its associated mold half into engagement with the plastic sheet in cooperation with the other mold half.

9. The apparatus of claim 8 wherein a motion transmitting means is connected between the said shafts associated with each platen so as to provide corresponding adjustment of the platen by rotation of either of said shafts.

* * * * *